US006662768B2

(12) United States Patent
Boyer et al.

(10) Patent No.: US 6,662,768 B2
(45) Date of Patent: Dec. 16, 2003

(54) SYSTEM AND METHOD FOR CONTROLLING AN ENGINE

(75) Inventors: Bradley Alan Boyer, Canton, MI (US); Joshua Putman Styron, Canton, MI (US); Mark Michael Madin, Canton, MI (US); V. Durga Nageswar Rao, Bloomfield Hills, MI (US); Yash Andrew Imai, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 10/105,749

(22) Filed: Mar. 25, 2002

(65) Prior Publication Data

US 2003/0177987 A1 Sep. 25, 2003

(51) Int. Cl.[7] .............................................. F02D 15/00
(52) U.S. Cl. ............................... 123/78 E; 123/406.23; 123/316
(58) Field of Search ........................... 123/78 E, 48 B, 123/48 R, 406.23, 316, 78 F, 78 BA, 78 A, 78 AA, 48 AA, 48 A, 197.3, 197.4, 406.29; 701/114, 111; 73/117.3

(56) References Cited

U.S. PATENT DOCUMENTS

| 4,834,031 | A |   | 5/1989  | Katoh et al.            |
|-----------|---|---|---------|-------------------------|
| 4,860,711 | A | * | 8/1989  | Morikawa ........ 123/48 D |
| 5,255,637 | A | * | 10/1993 | Schechter ....... 123/48 R |
| 5,562,068 | A |   | 10/1996 | Sugimoto et al.         |
| 5,682,854 | A | * | 11/1997 | Ozawa ........... 123/316  |
| 5,927,236 | A | * | 7/1999  | Gonzalez ....... 123/78 F  |
| 6,453,854 | B1| * | 9/2002  | Baeuerle et al. .. 123/78 E |

* cited by examiner

Primary Examiner—Henry C. Yuen
Assistant Examiner—Hyder Ali
(74) Attorney, Agent, or Firm—John F. Buckert; Allan J. Lippa

(57) ABSTRACT

A system and method for controlling an engine is provided. The engine includes first and second pressure responsive devices varying compression ratios in first and second engine cylinders, respectively. The method includes commanding the first and second devices to decrease compression ratios in the first and second cylinders, respectively. The method further includes indicating when the first device has not decreased a compression ratio in the first cylinder. Finally, the method includes commanding the second device to increase a compression ratio in the second cylinder to reduce engine torque fluctuations.

21 Claims, 11 Drawing Sheets

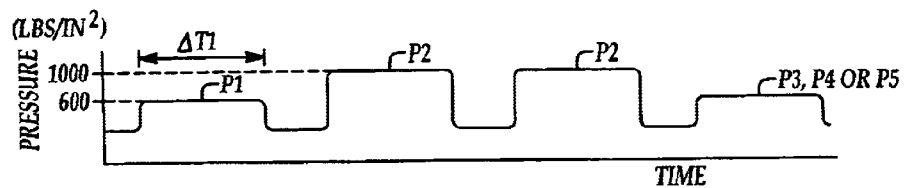
*Figure 10*
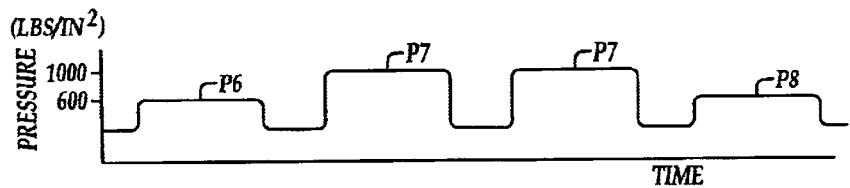
*Figure 11*
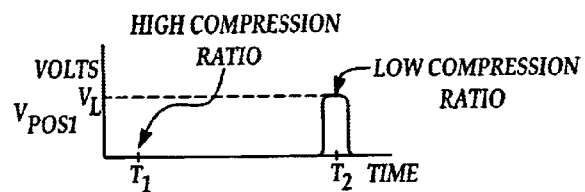
*Figure 12*
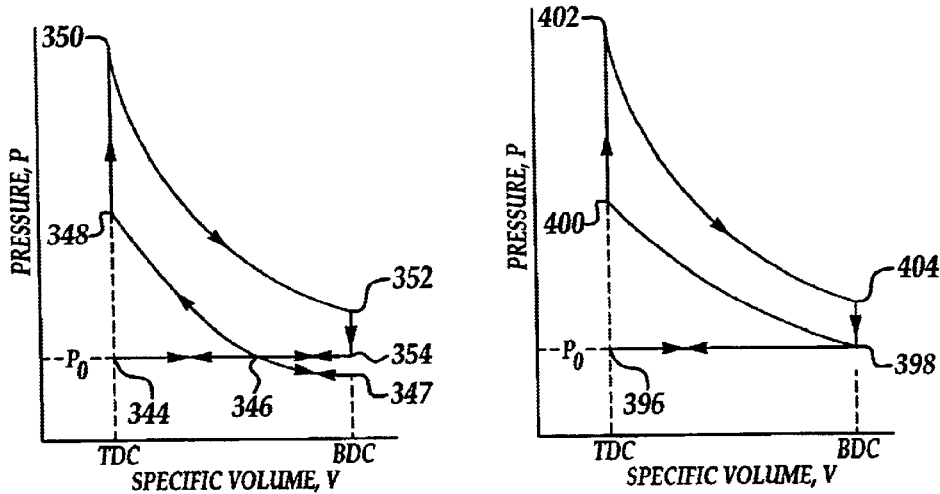
*Figure 13*
*Figure 14*
*Prior Art*

SYSTEM AND METHOD FOR CONTROLLING AN ENGINE

BACKGROUND OF THE INVENTION

1. Field of the Invention

The invention relates to a system and a method for controlling an engine, and particularly, to a system and a method for controlling pressure responsive devices that vary compression ratios in engine cylinders.

2. Background Art

A "compression ratio" of an internal combustion engine is defined as the ratio of the volume in a cylinder above a piston when the piston is at bottom-dead-center (BDC) to the volume in the cylinder above the piston when the piston is at top-dead-center (TDC). In general, increasing a compression ratio results in increasing the thermal efficiency of the engine. This in turn results in improved fuel economy and a higher ratio of output energy versus input energy of the engine.

A known variable compression ratio system is disclosed in U.S. Pat. No. 4,834,031 entitled "Variable Compression-Ratio Control Device For An Internal Combustion Engine." The known system utilizes a variable compression ratio (VCR) mechanism for varying a compression ratio of an engine cylinder between a high compression ratio and a low compression ratio. The system also utilizes a sensor for detecting a current compression ratio and a fault-detecting unit for detecting a malfunction of the sensor. When a fault is detected in the sensor, the system lowers the compression ratio of the engine cylinder.

The known system, however, does not recognize nor solve the problem of controlling an engine when one or more VCR mechanisms are unable to transition the corresponding engine cylinders from a high compression ratio to a low compression ratio. Thus, when one or more of cylinders are not transitioned to the low compression ratio and the remaining cylinders are transitioned to the low compression ratio, the engine cylinders are not all be operating at the same compression ratio. Thus, the engine cylinders at a high compression ratio may produce higher torques than the engine cylinders at the lower compression ratio, resulting in undesirable engine torque fluctuations.

SUMMARY OF THE INVENTION

A system and a method are provided that addresses the problems of the known system by reducing and/or eliminating engine torque fluctuations when at least one VCR mechanism in an engine is unable to lower a compression ratio in a corresponding engine cylinder.

A method is provided that controls an engine having first and second pressure responsive devices that can vary compression ratios in first and second engine cylinders, respectively. A pressure responsive device is defined as any device capable of varying a compression ratio in an engine cylinder responsive to a received fluid pressure or pressure signal. For example, a pressure responsive device may include one or more of the following devices: (i) a variable length connecting rod as taught herein, (ii) a variable length connecting rod, such as a connecting rod using an eccentric ring disposed about a crankpin, as disclosed in U.S. Pat. No. 5,562,068, (iii) a variable length connecting rod having a gear arrangement for varying the length of the connecting rod, (iv) a device that can vary a position of a cylinder rod relative to a crankshaft, (v) a device that can vary an internal geometry or volume of an engine cylinder, (vi) a device that can vary a piston geometry, such as a piston height or thickness for example, and (vii) a crankshaft having an eccentric crankshaft bearing where the operating position of the bearing is varied to vary a cylinder compression ratio.

The method includes commanding the first and second devices to decrease compression ratios in the first and second cylinders, respectively. The method further includes indicating when the first device has not decreased a compression ratio in said first cylinder. Finally, the method includes commanding said second device to increase a compression ratio in said second cylinder to reduce engine torque fluctuations.

A system is provided for controlling an engine having first and second pressure responsive devices varying compression ratios in first and second engine cylinders, respectively. The system includes a sensor that generates a signal indicative of a compression ratio of the first cylinder. The sensor may comprise a (i) positional sensor that indicates an effective length of a variable length connecting rod that is indicative of a compression ratio in the first cylinder, or (ii) a pressure sensor that measures pressures in said first cylinder at a piston top-dead-center (TDC) position and the piston bottom-dead-center (BDC) position indicative of the compression ratio in the first cylinder. The system further includes a controller operably connected to the sensor. The controller is configured to command the first and second devices to reduce compression ratios in the first and second cylinders, respectively, from a first compression ratio to a second compression ratio. The controller is further configured to determine when the first device has not changed a compression ratio in the first cylinder. Finally, the controller is configured to command the second device to obtain the first compression ratio in the first cylinder to reduce engine torque fluctuations.

The control system and method for controlling an engine in accordance with the present invention provides a substantial advantage over known systems and methods. The system and method reduces undesirable engine torque fluctuations when one or more variable compression engine cylinders are unable to transition to a low compression ratio. In particular, when this malfunction occurs, the system and method transitions all of the engine cylinders to a high compression ratio to obtain an equivalent torque output in the engine cylinders to reduce engine torque fluctuations.

BRIEF DESCRIPTION OF THE DRAWINGS

FIG. 10 is a schematic of signals utilized to transition engine cylinders from a high compression ratio to a low compression ratio.

FIG. 11 is a schematic of signals utilized to transition engine cylinders from a low compression ratio to a high compression ratio.

FIG. 12 is a schematic of signals generated a position sensor indicative of a compression ratio in an engine cylinder.

FIG. 13 is a schematic of a Miller combustion cycle.

FIG. 14 is a schematic of a conventional Otto combustion cycle with no adjustment of engine intake valve timing.

DETAILED DESCRIPTION OF AN EMBODIMENT

Figure 1:
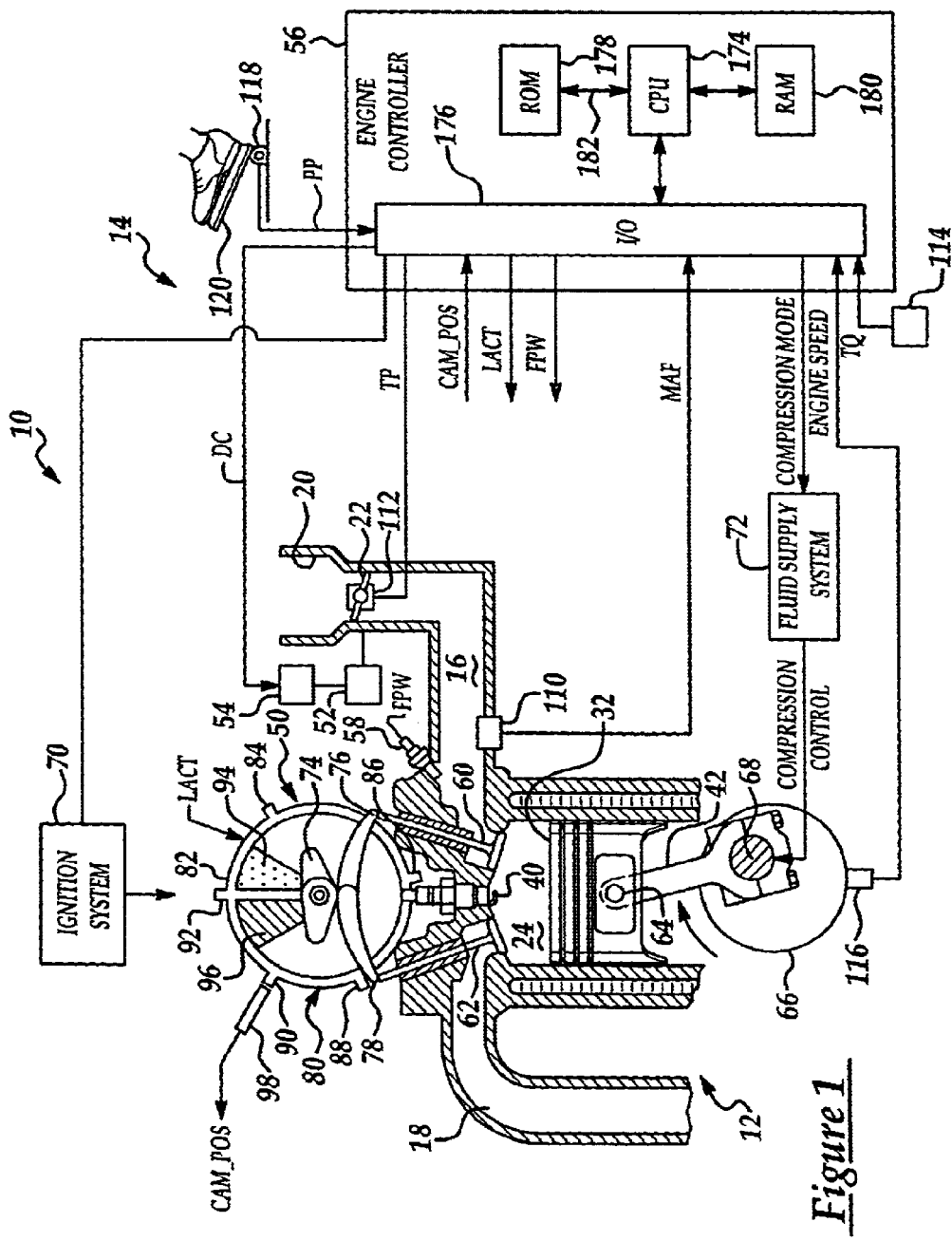
FIG. 1 is a schematic of a vehicle having a engine and an engine control system for controlling variable compression ratio engine cylinders.

Referring now to the drawings, like reference numerals are used to identify identical components in the various views. Referring to FIG. 1, a vehicle 10 is illustrated. Vehicle 10 includes an engine 12 and an engine control system 14. As illustrated, engine control system 14 is in electrical and hydraulic communication with engine 12.

Figure 2:
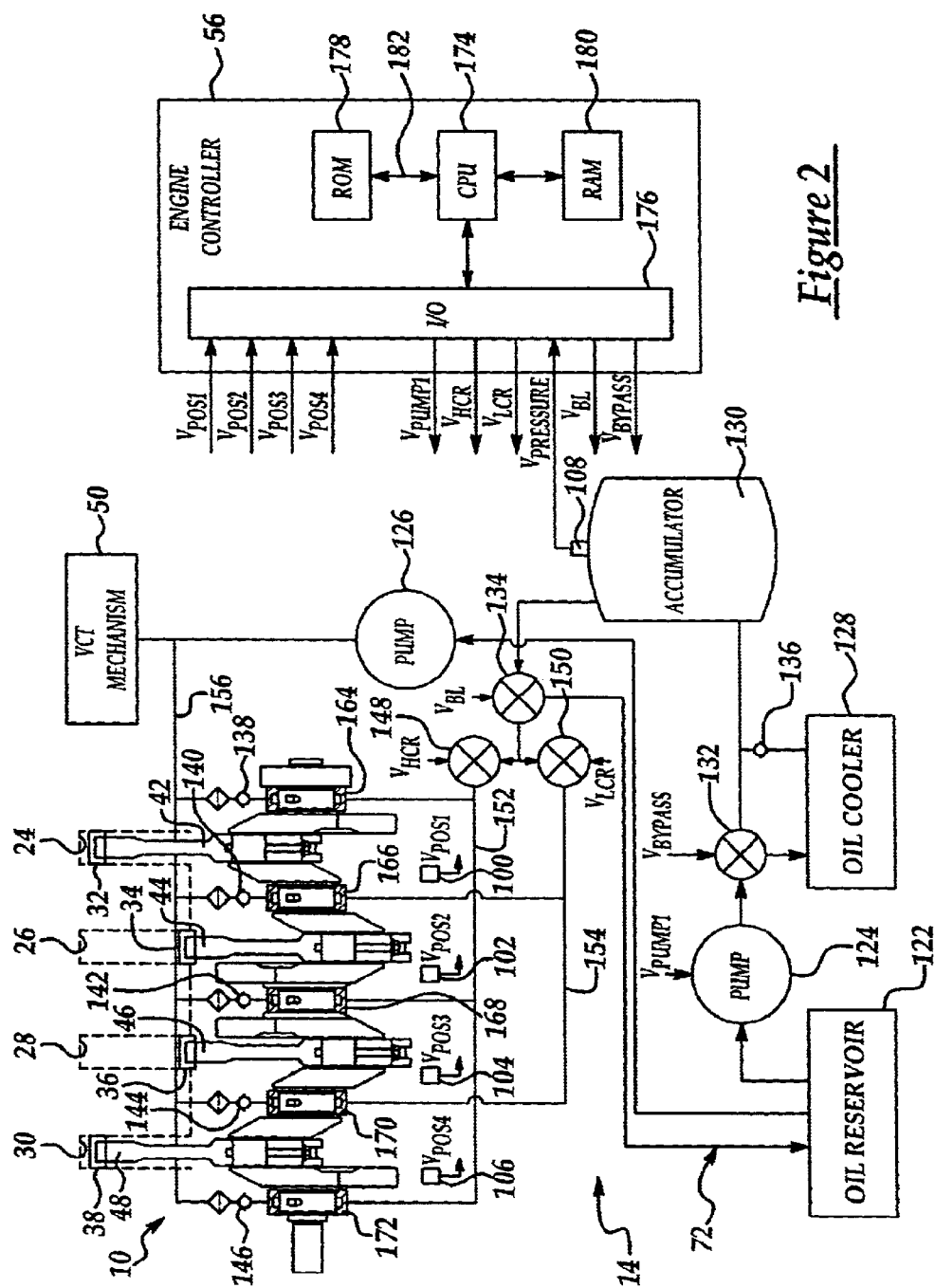
FIG. 2 is a schematic of the fluid supply system of FIG. 1.

Engine 12, for example, may comprise a gasoline, four-stroke, port fuel injection, internal combustion engine. Alternatively, engine 12 may be any internal combustion engine, such as a direct fuel injection engine or a diesel engine. Further, the number of cylinders of engine 12 can be greater than or less than four cylinders depending on the desired vehicle performance. Referring to FIGS. 1 and 2, engine 12 includes an intake manifold 16, an exhaust manifold 18, a throttle body 20, a throttle plate 22, cylinders 24, 26, 28, 30, pistons 32, 34, 36, 38, spark plugs 40 (only one of four spark plugs 40 is shown), connecting rod assemblies 42, 44, 46, 48, and VCT mechanism 50.

Intake manifold 16 communicates with throttle body 20 via throttle plate 22. Throttle plate 22 is controlled by electric motor 52 which receives a signal from ETC driver 54. ETC driver 54 receives a control signal (DC) from a controller 56. Intake manifold 16 includes a fuel injector 58 coupled thereto for delivering fuel in proportion to the pulse width of signals (FPW) from controller 56. Fuel is delivered to fuel injector 58 by a conventional fuel system (not shown) including a fuel tank, a fuel pump, and a fuel rail.

Each of cylinders 24, 26, 28, 30 communicate with intake manifold 16 and exhaust manifold 18 via respective intake and exhaust valves 60, 62. Thus, each of cylinders 24, 26, 28, 30 has an intake valve 60 and an exhaust valve 62. Cylinders 24, 26, 28, 30 further include combustion chambers having reciprocating pistons 32, 34, 36, 38, respectively, operably disposed therein. Pistons 32, 34, 36, 38 are connected to connecting rod assemblies 42, 44, 46, 48 via respective wrist pins 64. Connecting rods 42, 44, 46, 48 are further coupled to crankshaft 66 via respective crankpins 68. Ignition of air-fuel mixtures within cylinders 24, 26, 28, 30 are controlled via respective spark plugs 40 which delivers ignition spark responsive to signals from distributorless ignition system 70.

Referring to FIG. 2, connecting rod assemblies 42, 44, 46, 48 are provided to vary compression ratio in cylinders 24, 26, 28, 30, respectively. As illustrated, each connecting rod assembly is in fluid communication with fluid supply system 72. Although each connecting rod assembly is described below as providing first and second or high and low compression ratios, each connecting rod assembly may be configured to provide one or more intermediate compression ratios for engine 12. The term "high compression ratio" means any compression ratio that is greater than any second compression ratio termed a "low compression ratio." The connecting rod assemblies will be explained in greater detail below.

Referring to FIG. 1, variable cam timing (VCT) mechanism 50 is provided to vary the actuation time of intake and exhaust valves 60, 62 for each of cylinders 24, 26, 28, 30. VCT mechanism 50 cooperates with a camshaft 74, which is shown communicating with rocker arms 76, 78 for variably actuating valves 60, 62. Camshaft 74 is directly coupled to housing 80. Housing 80 forms a toothed cam wheel 82 having teeth 84, 86, 88, 90, 92. Housing 80 is hydraulically coupled to an inner shaft (not shown), which is in turn directly linked to camshaft 74 via a timing chain (not shown). Therefore, housing 80 and camshaft 74 rotate at a speed substantially equivalent to the inner camshaft. The inner camshaft rotates at a constant speed ratio to crankshaft 66. However, by manipulation of the hydraulic coupling described later herein, the relative position of camshaft 74 to crankshaft 66 can be varied by hydraulic pressure in advance chamber 94 and retard chamber 96. By allowing high-pressure hydraulic fluid to enter advance chamber 94, the relative relationship between camshaft 74 and crankshaft 66 is advanced. Thus, intake valve 60 and exhaust valve 62 open and close at a time earlier than normal relative to crankshaft 66. Similarly, by allowing high-pressure hydraulic fluid to enter retard chamber 96, the relative relationship between camshaft 74 and crankshaft 66 is retarded. Thus, intake valve 60 and exhaust valve 62 open and close at a time later than normal relative to crankshaft 66.

Teeth 84, 86, 88, 92 of cam wheel 82 are coupled to housing 80 and camshaft 74 and allow for measurement of relative position of camshaft 74 via cam timing sensor 98 which provides signal CAM_POS to controller 56. Tooth 90 is used for cylinder identification. As illustrated, teeth 84, 86, 88, 92 may be evenly spaced around the perimeter of cam wheel 82. Controller 56 sends control signal LACT to a conventional solenoid spool valve (not shown) to control the flow of hydraulic fluid either into advance chamber 94, retard chamber 96, or neither of VCT mechanism 50.

Relative position of camshaft 74 is measured in general terms, using the time, or rotation angle between the rising edge of a PIP signal and receiving a signal from one of teeth 84, 86, 88, 90, 92. A detailed description of the method for determining relative position of the camshaft 74 is described in commonly assigned U.S. Pat. No. 5,245,968 which is incorporated by reference herein in its entirety.

Referring to FIGS. 1 and 2, engine control system 14 is provided to control operation of engine 12 and in particular to effect a change in the compression ratio of engine 12. Engine control system includes fluid supply system 72, distributorless ignition system 70, an electric motor 52 for controlling throttle plate 22, an ETC driver 54, connecting rod position sensors 100, 102, 104, 106, an accumulator pressure sensor 108, a mass air flow sensor 110, a throttle position sensor 112, a torque sensor 114, an engine speed sensor 116, pedal position sensor 118, an accelerator pedal 120, and controller 56. Engine control system 14 controls fluid supply system 72 and connecting rod assemblies 42, 44, 46, 48 to effect a change in the compression ratio of engine 12.

Referring to FIG. 2, fluid supply system 72 is provided to control the operation of connecting rod assemblies 42, 44, 46, 48. In particular, fluid supply system 72 controls the application of hydraulic fluid pressure to connecting rods 42, 44, 46, 48 to vary compression ratios in cylinders 24, 26, 28, 30, respectively. The fluid supply system 72 includes an oil reservoir 122, fluid pumps 124, 126, an oil cooler 128, a fluid accumulator 130, a bypass valve 132, a bleed valve 134, check valves 136, 138, 140, 142, 144, 146, control valves 148, 150 and fluid manifolds 152, 154, 156.

The pump 124 is provided to pump fluid, such as engine oil, from reservoir 122 through bypass valve 132 to fluid accumulator 130. Pump 124 is conventional in the art and may pump oil at a pressure of 1000 P.S.I., responsive to a signal ($V_{PUMP1}$) received from controller 56. Reservoir 122 also collects oil that drains from engine 12.

The oil cooler 128 is provided to cool the engine oil pumped therethrough. Those skilled in the art will recognize that lowering a temperature of the engine oil increases the oil viscosity. The increased oil viscosity can reduce an amount of oil leakage in fluid supply system 72 if oil leakage occurs. Oil cooler 128 receives engine coolant (not shown) from engine 12 which is routed through cooler 128 to cool the engine oil. As illustrated, oil cooler 128 receives the engine oil when bypass valve 132 routes oil into cooler 128 responsive to a signal ($V_{BYPASS}$) received from controller 56. Thereafter, the oil is routed through check valve 136 to accumulator 130. Otherwise, when bypass valve 132 is not actuated, the pressurized oil is pumped directly from pump 124 into accumulator 130.

The fluid accumulator 130 is provided to hold the pressurized engine oil that will be utilized to change an effective length of connecting rods 42, 44, 46, 48. The accumulator 130 is conventional in the art and may hold oil at a pressure of 1000 P.S.I., for example. The pressure sensor 108 may generate a signal ($V_{PRESSURE}$) indicative of a pressure within accumulator 130 that is received by controller 56.

The bleed valve 134 receives pressurized oil from accumulator 130 and is provided to control the pressure of oil supplied to valves 148, 150. In particular, bleed valve 134 may reduce the pressure of the oil received from accumulator 130 by bleeding a portion of the oil back to oil reservoir 122 responsive to a signal ($V_{BL}$) from controller 56. For example, if accumulator 130 is storing pressurized oil at 1000 P.S.I., bleed valve 134 may be actuated to reduce the oil pressure supplied to valves 148, 150 to 600 P.S.I. Alternately, for example, bleed valve 134 could provide pressurized oil at 1000 P.S.I. to valves 148, 150.

The normally-closed valve 148 is provided to deliver pressurized oil to manifold 152 to induce connecting rods 42, 44, 46, 48 to change to high compression ratio as explained in greater detail below. In particular, when valve 148 opens responsive to signal ($V_{HCR}$) received from controller 56, pressurized oil is supplied to connecting rods 42, 44, 46, 48 to induce the rods to obtain a high compression ratio in cylinders 24, 26, 28, 30, respectively. The pulse width of an oil pressure pulse is determined by the pulse width of the signal ($V_{HCR}$).

The normally-closed valve 150 is provided to deliver pressurized oil to manifold 154 to induce connecting rods 42, 44, 46, 48 to change to a low compression ratio as explained in greater detail below. In particular, when valve 150 opens responsive to signal ($V_{LCR}$) received from controller 56, pressurized oil is supplied directly to connecting rods 42, 44, 46, 48 to induce the rods to obtain a low compression ratio in cylinders 24, 26, 28, 30, respectively. The pulse width of an oil pressure pulse is determined by the pulse width of the signal ($V_{LCR}$).

The pump 126 is provided to pump fluid, such as engine oil, from reservoir 122 through manifold 156 to crankshaft bearings 164, 166, 168, 170, 172 for lubrication purposes. Pump 126 is conventional in the art and may be mechanically driven, directly or indirectly, by crankshaft 66. Pump 126 may pump oil at a pressure between 40–60 P.S.I. depending on engine speed. As illustrated, check valves 138, 140, 142, 144, 146 allow oil from manifold 156 to lubricate bearings 164, 166, 168, 170, 172 only when valves 148, 150 are not actuated. Further, pump 126 provides pressured oil to VCT mechanism 50.

Connecting rod position sensors 100, 102, 104, 106, generate signals ($V_{POS1}$), ($V_{POS2}$), ($V_{POS3}$), ($V_{POS4}$) whose voltage level indicates a distance of connecting rods 42, 44, 46, 48 from sensors 100, 102, 104, 106 when the connecting rods are at a bottom-dead-center position (BDC). Thus, the signals ($V_{POS1}$), ($V_{POS2}$), ($V_{POS3}$), ($V_{POS4}$) can be utilized to determine whether connecting rods 42, 44, 46, 48 are (i) in an extended position to obtain a high compression ratio, or (ii) in an unextended position to obtain a low compression ratio.

Referring to FIG. 12, for example, at time Ti, when connecting rod 42 is at BDC, the signal ($V_{POS1}$) has a voltage level of 0 volts that indicates rod 42 has an extended position causing cylinder 24 to have a high compression ratio. At time T2, when connecting rod 42 is at BDC, signal ($V_{POS1}$) has a voltage level of $V_L$ volts that indicates rod 42 has an unextended position causing cylinder 24 to have a low compression ratio. In an alternate embodiment (not shown), one or more of sensors 100, 102, 104, 106 could be replaced by pressure sensors that directly measure the pressure in each of cylinders 24, 26, 28, 30 to determine whether the cylinders are at a high or low compression ratio.

Accumulator pressure sensor 108 generates a signal ($V_{PRESSURE}$) indicating a fluid pressure within accumulator 130 that is transmitted to controller 56 for closed-loop control of the pressure within accumulator 130.

Referring to FIG. 1, mass air flow sensor 110 generates a signal indicating the inducted mass air flow (MAF) that is transmitted to controller 56. Controller 56 may utilize (MAF) during stoichiometric operation to determine engine load. Sensor 110 may be coupled to throttle body 20 or intake manifold 16.

Throttle position sensor 112 generates a signal indicating a throttle position (TP) of throttle plate 22 received by controller 56 for closed-loop control of plate 22.

Torque sensor 114 generates a signal (TQ) that may indicate one of the following torque values: (i) an engine crankshaft torque, (ii) a transmission torque, such as for example, a torque converter torque or a transmission output shaft torque, or (iii) an axle torque.

Engine speed sensor 116 may comprise a hall-effect sensor that generates a signal (N) indicating an engine speed. Sensor 116 may be coupled to crankshaft 66 and transmits signal (N) to controller 56.

Accelerator pedal 120 is shown communicating with a driver's foot. Pedal position sensor 118 generates a signal indicating accelerator pedal position (PP) that is transmitted to controller 56.

The engine controller 56 includes a central processing unit (CPU) 174, input/output ports 176, read-only memory (ROM) 178 or any suitable electronic storage medium containing processor-executable instructions and calibration values, random-access memory (RAM) 180, and a data bus 182 of any suitable configuration. The engine controller 56 receives signals from a variety of sensors, such as the sensors discussed above, and controls operation of the fluid supply system 72, fuel injectors 58, throttle plate 22, and spark plugs 40, as explained in greater detail below.

Figure 3:
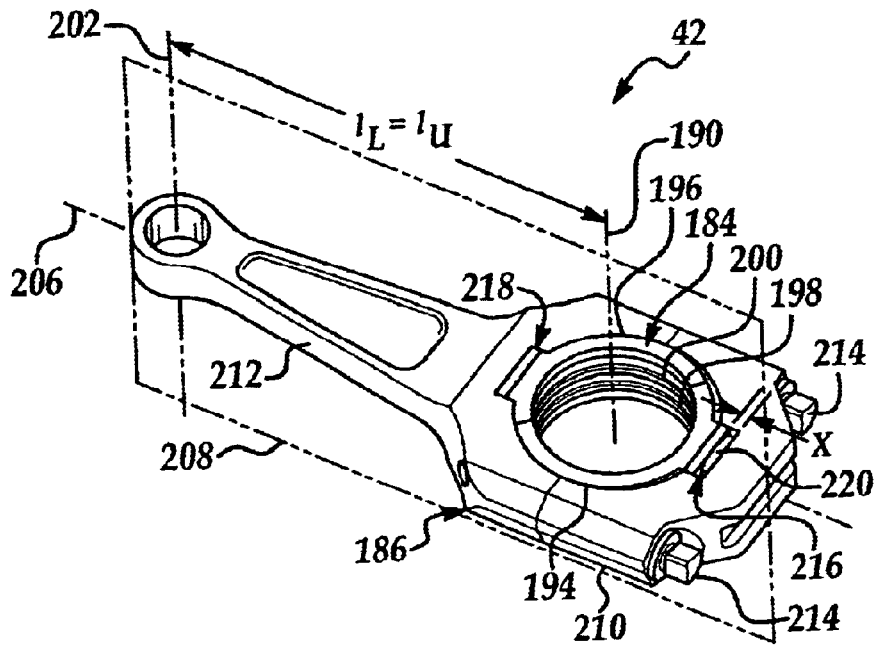
FIG. 3 is a perspective view of a connecting rod assembly shown in an unextended position.
Figure 5:
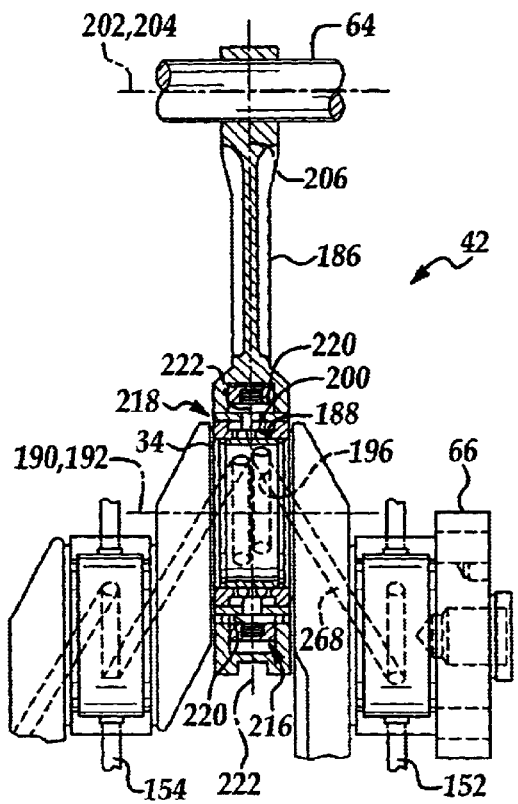
FIG. 5 is a cross-sectional view of the connecting rod assembly in the unextended position and including first and second locking mechanisms.
Figure 6:
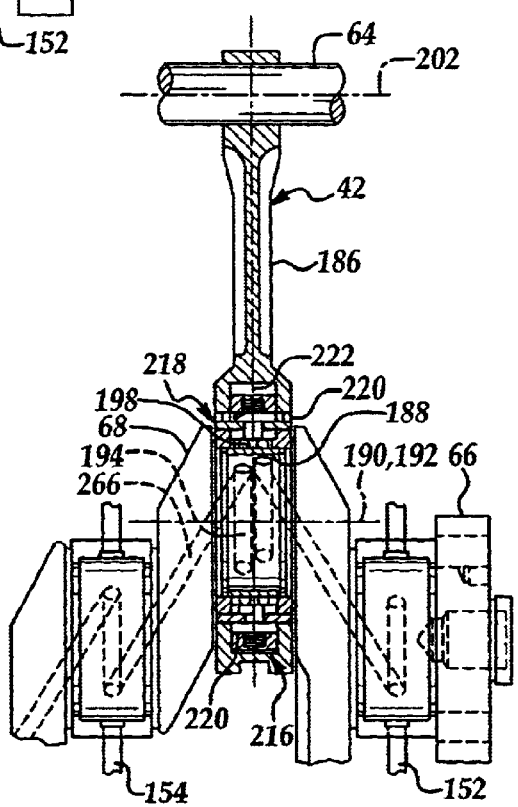
FIG. 6 is a cross-sectional view of the connecting rod assembly in the extended position.

Referring to FIGS. 3 and 6, connecting rod assembly 42 will now be discussed in detail. Because connecting rods 42, 44, 46, 48 have an identical structure, the description of connecting rod 42 also applies to connecting rods 44, 46, 48. As illustrated, connecting rod 42 includes a first portion, such as bearing retainer 184, that is adapted to be rotatably coupled to crankpin 68, and a second portion, such as body portion 186, that is adapted to be rotatably coupled to wrist pin 64. The bearing retainer 184 is configured to retain a bearing 188 (see FIG. 5) between bearing retainer 184 and crankpin 68, and includes a bearing retainer axis 190 that is coincident with crankpin axis 192. The bearing retainer 184 may further include first and second sections 194 and 196, respectively, that are joined together in any suitable manner, such as with bolts, screws or other suitable fasteners (not shown). In addition, bearing retainer 184 includes first and second continuous, circumferential grooves or channels 198 and 200 that receive fluid from fluid supply system 72.

The body portion 186 has a lateral axis 202 that is coincident with wrist pin axis 204 (see FIG. 5). The body portion 186 also has a longitudinally extending body portion axis 206 and a body portion plane 208 that extends through body portion axis 206 and bisects body portion 186. In addition, body portion 186 includes first and second sections 210 and 212, respectively, and each section 210 and 212 defines a generally semicircular aperture for receiving bearing retainer 184. The sections 210 and 212 may be joined together in any suitable manner, such as with fasteners 214, so as to retain bearing retainer 184 therebetween.

Figure 4:
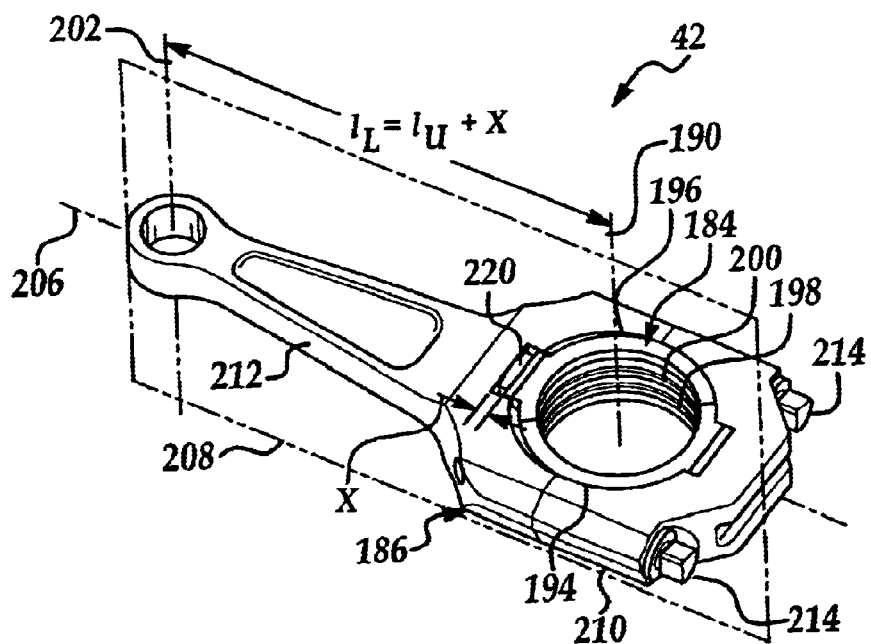
FIG. 4 is a perspective view of the connecting rod assembly shown in an extended position.

Further, body portion 186 is axially movable with respect to bearing retainer 184 between a first position or unextended position (shown in FIGS. 3 and 5) and a second position, or extended position (shown in FIGS. 4 and 6). Referring to FIGS. 3 through 6, for example, body portion 186 is displaceable by a distance x. When body portion 186 is in the unextended position, which corresponds to a first or low compression ratio mode of engine 12, the effective length $l_L$ of body portion 186 is equal to the unextended length $l_U$. When body portion 186 is in the extended position, which corresponds to a second or high compression ratio mode of engine 12, the effective length $l_H$ of body portion 186 is equal to the extended length $l_U$+x. Thus, body portion 186 is selectively displaceable with respect to bearing retainer 184 so as to cause a change in the effective length of body portion 186 and the compression ratio of engine 12.

The connecting rod assembly 42 also includes first and second locking mechanisms 216 and 218, respectively, for locking body portion 186 at the unextended and extended positions. Referring to FIGS. 5 and 6, each locking mechanism 216 and 218 includes a locking member or element 220 having a locking element axis 222 about which locking element 220 may rotate. Preferably, but not necessarily, each locking element axis 222 is coincident with or otherwise aligned with body portion axis 206 (see FIG. 4). Each locking element 220 is rotatable between an unlocked position and a locked position in which locking element 220 extends into a gap formed between bearing retainer 184 and body portion 186. More specifically, when a particular locking element 220 is in the locked position, locking element 220 overlaps and is engaged with bearing retainer 184 and body portion 186. Referring to FIG. 5, locking element 220 of first locking mechanism 216 is shown in the locked position and element 220 of second locking mechanism 218 is shown in the unlocked position. Referring to FIG. 6, locking element 220 of first locking mechanism 216 is shown in an unlocked position and locking element 220 of second locking mechanism 218 is shown in a locked position.

Further, when a particular locking element 220 is in the locked position, locking element 220 preferably, but not necessarily, intersects body portion plane 81 shown in FIG. 3. With such a configuration, locking elements 220 inhibit rotational movement or twisting of body portion 186 relative to bearing retainer 184 when locking elements 220 are compressively loaded.

Figure 7:
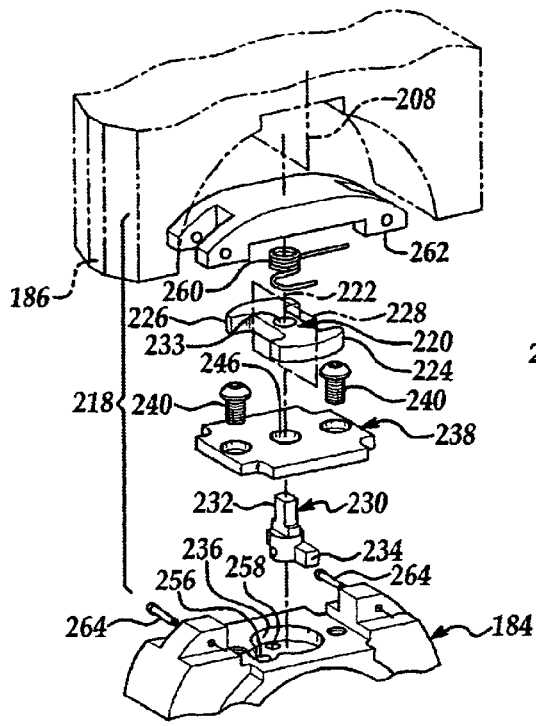
FIG. 7 is an exploded perspective view of a portion of the connecting rod assembly including the second locking mechanism.
Figure 8:
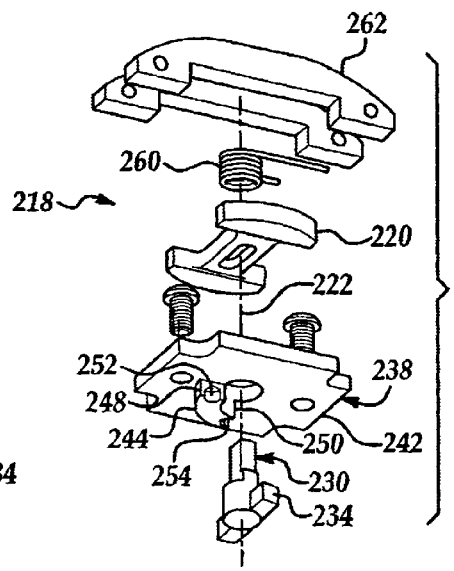
FIG. 8 is an exploded perspective view of the second locking mechanism.

Referring to FIGS. 7 and 8, additional features of second locking mechanism 218 will now be described in detail. Because first locking mechanism 216 is similar to second locking mechanism 218, a thorough understanding of first locking mechanism 216 will be apparent from the following description of second locking mechanism 218. The locking element 220 of first locking mechanism 216, however, is oriented 90 degrees in a clockwise direction relative to locking element 220 of second locking mechanism 218, such that first locking mechanism 216 is in the unlocked position when second locking mechanism 218 is in the locked position.

Referring to FIG. 7, locking element 220 of second locking mechanism 218 includes first and second enlarged, arcuate ends 224 and 226, respectively, that are configured to overlap and engage bearing retainer 184 and body portion 186 when locking element 220 is in the locked position, so as to create a compression fit between bearing retainer 184 and body portion 186. The locking element 220 also has a locking element plane 228 that bisects locking element 220. Preferably, but not necessarily, locking element plane 228 is aligned with body portion plane 208 when locking element 220 is in the locked position, such that compressive loading on locking element 220 is generally uniform and symmetrical relative to locking element plane 228.

The second locking mechanism 218 further includes a rotatable pivot shaft 230 on which locking element 220 is mounted or otherwise disposed, such that locking element 220 is rotatable with pivot shaft 230. The pivot shaft 230 includes a shaft portion 232 that extends through an aperture 233 of locking element 220, and a base or vane portion 234 rotatably disposed at least partially in a generally cylindrical recess 236 of bearing retainer 184.

Referring to FIGS. 7 and 8, a cover plate 238 is disposed between locking element 220 and vane portion 234, and is mounted to bearing retainer 184, such as with fasteners 240, so as to retain vane portion 234 at least partially in recess 236. The plate 238 has a plate portion 242 and a projection 244 extending from plate portion 242. The plate portion 242 has an aperture 246 for receiving shaft portion 232 of pivot shaft 230. The projection 244 defines first and second stops 248 and 250, respectively, that are engageable with vane portion 234 so as to respectively stop locking element 220 in the unlocked and locked positions. The projection 244 also has first and second grooves or channels 252 and 254, respectively, for routing fluid between projection 244 and vane portion 234. The first and second channels 252 and 254, respectively, are aligned with first and second apertures 256 and 258 of bearing retainer 184 so as to receive pressurized fluid from fluid supply system 72, as explained below in detail. The bearing retainer 184 is partially broken away in FIG. 7 to show first aperture 256.

The second locking mechanism 218 further includes a spring, such as a torsion spring 260, disposed about shaft portion 232 and engaged with locking element 220 for urging locking element 220 toward the locked position. In addition, second locking mechanism 218 includes a cover or cap 262 attached to bearing retainer 184 for retaining locking element 220 and spring 260 on bearing retainer 184.

While the cap 262 may be attached to bearing retainer 184 in any suitable manner, in the embodiment shown in FIG. 7, cap 262 is attached to bearing retainer 184 with fasteners 264.

Referring to FIGS. 3 through 7, a method for mounting connecting rod assembly 42 on crankshaft 66 will now be described. The method includes attaching first locking mechanism 216 to first section 194 of bearing retainer 184. The method further includes attaching second locking mechanism 218 to second section 196 of bearing retainer 184. The method further includes securing first and second sections 194 and 196 around crankpin 68 of crankshaft 66, such as with fasteners or by any other suitable means. Next, the method involves positioning first section 210 of body portion 186 over first locking mechanism 216, such that first locking mechanism 216 is received in a portion of an aperture defined by first section 210. The method further includes moving locking element 220 of first locking mechanism 216 to the unlocked position. Next, the method involves positioning second section 212 of body portion 186 over second locking mechanism 218, such that second locking mechanism 218 is received in a portion of an aperture defined by second section 212. The method further includes securing first section 210 to second section 212 in any suitable manner, such as with fasteners 214. Fasteners 214 may be, for example, bolts or screws.

Referring to FIGS. 2 and 5–8, operation of engine control system 14 for changing a compression ratio in an engine cylinder will be explained. When engine controller 56 determines that it is desirable to change the compression ratio of engine 12, based on one or more operating parameters, the engine controller 56 may control operation of fluid supply system 72 so as to supply pressurized oil from manifolds 152, 154 to connecting rod assemblies 42, 44, 46, 48.

For example, if engine controller 56 determines that it is desirable to change from high compression ratio mode shown in FIG. 6 to low compression ratio mode shown in FIG. 5, engine controller 56 may open valve 150 of fluid supply system 72 for a predetermined amount of time, such as 100 to 300 milliseconds, while keeping valve 148 closed. As a result, pressurized oil is routed through manifold 154, and a pressure differential is created across manifolds 154, 152, respectively, which activates locking mechanisms 216, 218 for each of connecting rod assemblies 42, 44, 46, 48.

More specifically, referring to FIGS. 6, 7 and 8, pressurized oil from manifold 154 may travel through first crankshaft passage arrangement 266 and first bearing aperture or apertures (not shown) in bearing 188, and then into channel 198 of bearing retainer 184. Next, pressurized oil passes through second aperture 258 (see FIG. 7) of bearing retainer 184 and into recess 236 and second channel 254 (see FIG. 8) of second locking mechanism 218. The pressurized oil acts on vane portion 234 of pivot shaft 230 so as to cause pivot shaft 230 and locking element 220 of second locking mechanism 218 to rotate approximately 90 degrees until vane portion 234 contacts first stop 248. In other words, the pressurized oil causes locking element 220 of second locking mechanism 218 to rotate from the locked position shown in FIGS. 6 and 8 to the unlocked position shown in FIG. 5.

With both locking mechanisms 216 and 218 in the unlocked position, body portion 186 is able to move axially relative to bearing retainer 184 from the extended position shown in FIG. 6 to the unextended position shown in FIG. 5. Such movement occurs as a result of inertia of body portion 186. Once body portion 186 reaches the unextended position, pressurized oil from second channel 200 acts on first locking mechanism 216, in a similar manner as described above with respect to second locking mechanism 218, so as to cause locking element 220 of first locking mechanism 216 to rotate to the locked position shown in FIG. 5.

Referring to FIGS. 2 and 5, when engine controller 56 determines that it is desirable to change back to high compression mode, engine controller 56 may control operation of fluid supply system 72 so as to route pressurized oil through manifold 152. Next, pressurized oil may travel through second crankshaft passage arrangement 268 and second bearing aperture or apertures (not shown) in bearing 188, and then into channel 200 of bearing retainer 184. Pressurized oil passing from channel 200 then acts on first locking mechanism 216 so as to move locking element 220 to the unlocked position, thereby allowing body portion 186 to move from the unextended position shown in FIG. 5 to the extended position shown in FIG. 6. Once body portion 186 reaches the extended position, pressurized oil passing from channel 200 acts on second locking mechanism 218 so as to cause locking element 220 to rotate to the locked position shown in FIG. 6.

Referring to FIGS. 2 and 6, it should be understood that each of connecting rods 42, 44, 46, 48 are rotated 180 degrees with respect to an adjacent connecting rod along crankshaft 66. Thus, for example, an oil passage 266 from connecting rod 42 and an oil passage 266 from connecting rod 44 would communicate with each other.

Figure 9A:
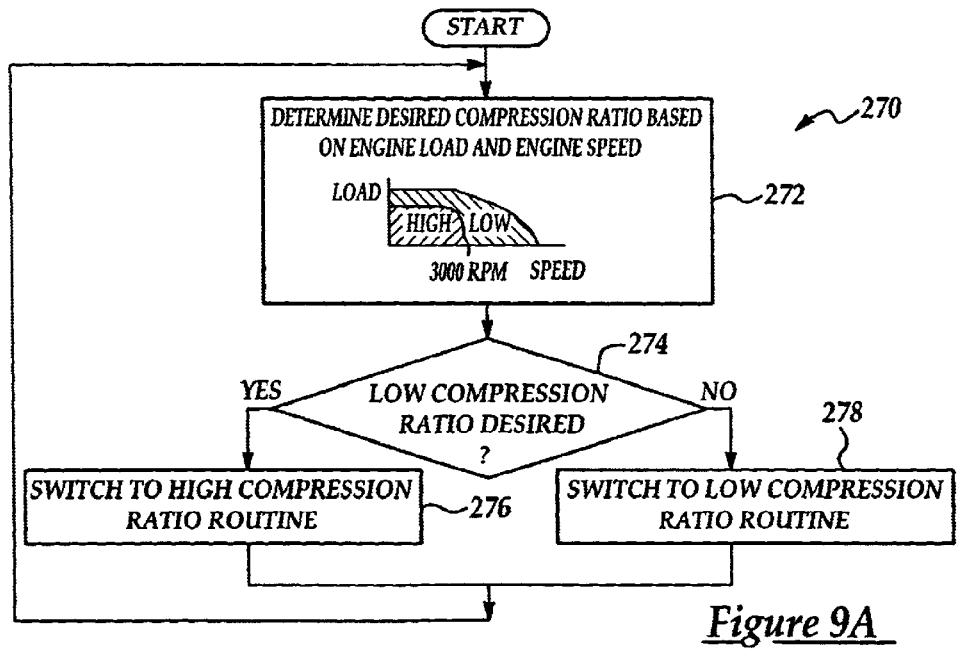
FIGS. 9A–9F are flowcharts of a method for controlling the engine in accordance with the present invention.

Referring to FIG. 9A, a method for controlling engine 12 in accordance with the present invention is provided. In particular, the method 270 controls pressure responsive devices, such as connecting rods 42, 44, 46, 48, to control compression ratios in engine cylinders 24, 26, 28, 30 to reduce engine torque fluctuations when a malfunction occurs in one or more of the connecting rods or in fluid supply system 72. As illustrated, a step 272 determines a desired compression ratio for cylinders 24, 26, 28, 30 based on engine load and engine speed (N). A table of desired compression values may be stored in ROM 178. The table may be indexed by an engine load value and an engine speed value (N) to obtain the desired compression ratio value.

Next at step 274, a determination is made as to whether cylinders 24, 26, 28, 30 should be operated at a low compression ratio to avoid "engine knock" based on the compression ratio determined in step 272. If the answer to step 274 equals "Yes", the method advances to step 278 which executes the Switch to Low Compression Ratio Routine. Alternately, the method advances to step 276 which executes the Switch To High Compression Ratio Routine.

Figure 9B:
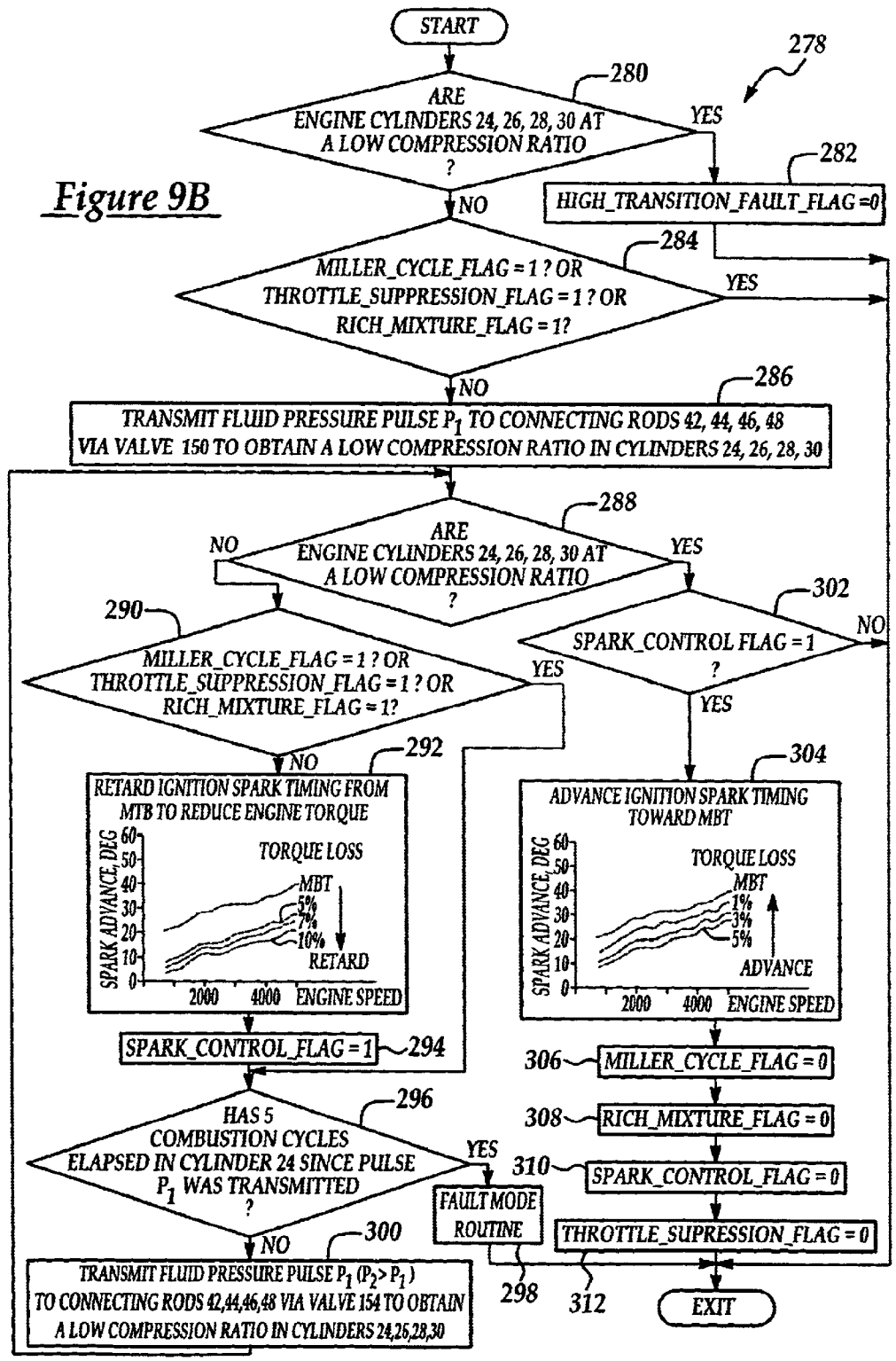

Referring to FIG. 9B, the Switch to Low Compression Ratio Routine 278 will be explained. As illustrated, at step 272 a determination is made as to whether engine cylinders 24, 26, 28, 30 are currently operating at a low compression ratio. As discussed above, signals ($V_{POS1}$), ($V_{POS2}$), ($V_{POS3}$), ($V_{POS4}$) from position sensors 100, 102, 104, 106 are utilized by controller 56 to determine the current compression ratio in cylinders 24, 26, 28, 30. If the value of step 280 equals "Yes", the method advances to step 282 which resets the High_transition_fault_flag to zero. Thereafter, the routine 278 is exited. Alternately, if the value of step 280 equals "No" indicating that at least one of cylinders 24, 26, 28, 30 is currently operating at a high compression ratio, the method advances to step 284.

At step 284, a determination is made as to whether any of the operating fault flags (i.e., Miller_cycle_flag, Throttle_ suppression_flag, Rich_mixture_flag) are set equal to one. When the Miller_cycle_flag equals one, the flag indicates that controller 56 is operating cylinders 24, 26, 28, 30 in a Miller combustion cycle because at least one of the cylinders 24, 26, 28, 30 was unable to transition to a low compression ratio in a previous iteration of method 278. The Miller combustion cycle will be explained in greater detail below. When the Throttle suppression flag equals one, the flag indicates that a maximum throttle position of throttle plate 22 is being limited to reduce engine knock—because at least one of cylinders 24, 26, 28, 30 was unable to transition to a low compression ratio in a previous iteration of the method 278. When the Rich_mixture flag equals one, the flag indicates that controller 56 is delivering a rich air-fuel mixture to cylinders 24, 26, 28, 30 to decrease. combustion temperatures in the cylinders to avoid engine knock—because at least one of the cylinders was unable to transition to a low compression ratio in a previous iteration of the method 278. Only one of the fault flags can be set equal to one during an iteration of the method 278. If the value of step 284 equals "Yes" indicating that one of the fault flags are set equal to one, the routine is exited. Otherwise, the method advances to step 286.

At step 286, a fluid pressure pulse P1 is transmitted to connecting rods 42, 44, 46, 48 via valve 150 to obtain a low compression ratio in cylinders 24, 26, 28, 30. Referring to FIG. 2, controller 56 may generate signal $V_{LCR}$ that causes valve 150 to open and supply fluid pressure pulse to connecting rods 42, 44, 46, 48. Pulse P1 induces locking elements 220 in locking mechanisms 218 in each of connecting rods 42, 44, 46, 48 to unlock to allow the connecting rods to move to an unextended position. Pulse P1 also induces locking elements 220 in locking mechanisms 216 in each of connecting rods 42, 44, 46, 48 thereafter lock the connecting rods in the unextended position. The controller 56 may generate pulse Pi for a time duration ΔT1 equal to or greater than combustion cycles in all of cylinders 24, 26, 28, 30. The time duration 66 T1 allows connecting rods 42, 44, 46, 48 sufficient time to change compression ratios in cylinders 24, 26, 28, 30. In particular, the time duration ΔT1 is dependent on engine speed (N) and may be calculated for a multi-cylinder engine using the following equation: AT1= K/N+Z, where N=engine speed (revolutions/minute), K=60 seconds/minute, z=additional time, such as 0.5 seconds for example, to ensure the pulse is provided for at least one engine revolution. The pulse P1 may have a magnitude of 600 P.S.I., for example.

Next at step 288, a determination is made as to whether engine cylinders 24, 26, 28, 30 are operating at a low compression ratio. If the value of step 288 equals "Yes", the method advances to step 302, otherwise, the method advances to step 290. Alternately, step 288 could check for any deteriorated response in one or more of engine cylinders 24, 26, 28, 30 including for example: (i) determining when one or more of the cylinders have not transitioned to a low compression ratio within a predetermined time period or (ii) determining when the compression ratio in one or more of the cylinders has not been decreased a predetermined amount.

At step 290, a determination is made as to whether any of the operating fault flags (i.e., Miller_cycle_flag, Throttle_suppression_flag, Rich_mixture_flag) are set equal to one. If the value of step 290 equals "No", the step 292 retards the ignition spark timing relative to a maximum brake torque (MBT) ignition timing. The controller 56 may retard the ignition spark timing in cylinders 24, 26, 28, 30 to reduce the effective torque in the cylinders because at least one of the cylinders is at a high compression ratio at this step. By retarding ignition timing, engine knock may be reduced in the cylinders at the high compression ratio. In particular, controller 56 may retard the ignition timing to obtain a 5–10% torque reduction relative to MBT in cylinders 24, 26, 28, 30.

Next at step 294, a Spark_control_flag is set equal to one indicating that the ignition timing has been retarded relative to MBT ignition timing.

After step 294 or when the value of step 290 equals "Yes", the method advances to step 296.

At step 296, a determination is made as to whether a predetermined number of combustion cycles, such as five cycles, have occurred in cylinder 24 since the fluid pressure pulse P1 was applied to connecting rods 42, 44, 46, 48. If the value of step 296 equals "No", the method advances to step 300. At step 300, a fluid pressure pulse P2—that has a greater pressure than pulse P1—is transmitted to connecting rods 42, 44, 46, 48 via valve 150 to obtain a low compression ratio in cylinders 24, 26, 28, 30. For example, pressure pulse P2 may have a magnitude of 1000 P.S.I. as compared to a pressure of 600 P.S.I. for pulse P1. Referring to FIGS. 2 and 10, controller 56 may generate signal ($V_{BL}$) to cause bleed valve 134 to provide a fluid pressure of 1000 P.S.I. that communicates with control valves 148, 150. Thereafter, controller 56 may generate signal ($V_{LCR}$) to cause valve 150 to open and supply fluid pressure pulse P2 to connecting rods 42, 44, 46, 48 to decrease the compression ratio of the engine cylinders. The time duration ΔT2 for fluid pressure pulse P2 may be calculated like ΔT1 based on engine speed.

Referring to FIG. 9B, after step 300, the method advances back to step 288. Thus, the method attempts to reduce the compression ratio of cylinders 24, 26, 28, 30 for up to five combustion cycles, before operating engine 12 in a fault mode of operation.

Referring again to step 296, if five combustion cycles have elapsed in cylinder 24 since pulse P1 was transmitted and all the cylinders 24, 26, 28, 30 are still not operating at a low compression ratio, the step 298 executes the Fault Mode Routine which will be explained in greater detail below.

Referring again to step 288, if the engine cylinders 24, 26, 28, 30 are operating at a low compression ratio as desired, the method advances to step 302.

At step 302 a determination is made as to whether Spark_control_flag was set equal to one. If the value of step 302 equals "Yes", then the method advances to step 304. Otherwise, the method 278 is exited.

At step 304, the ignition spark timing is advanced toward the MBT ignition timing. In particular, controller 56 may advance the ignition timing in cylinders 24, 26, 28, 30 to obtain a 1–5% torque reduction relative to MBT in cylinders 24, 26, 28, 30.

Next at steps 306, 308, 310, 312, the Miller_cycle_flag, the Rich_mixture_flag, the Spark_control_flag, and the Throttle_suppression_flag, respectively, are set equal to zero. Thereafter, the routine 278 is exited.

Figure 9C:
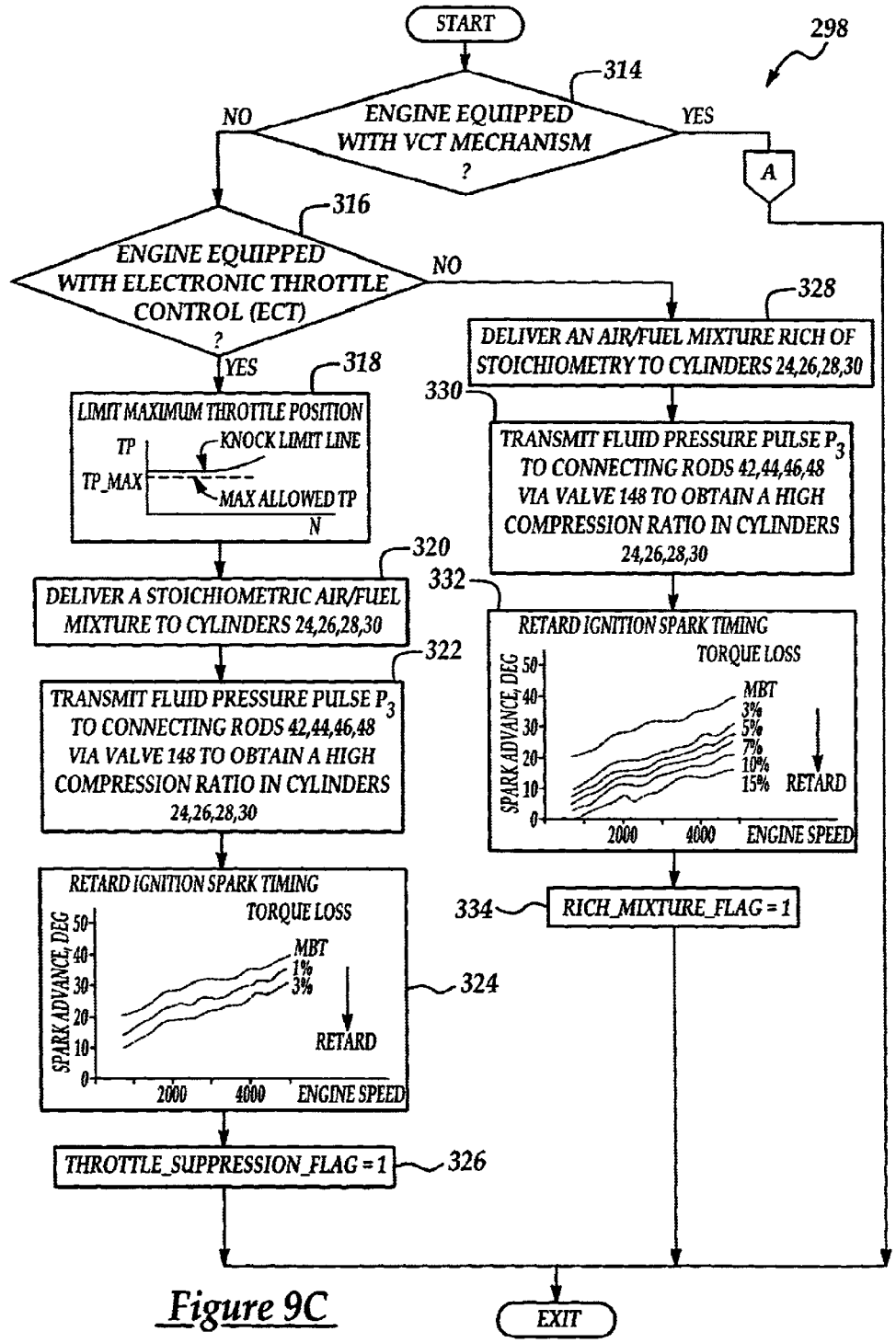

Referring to FIG. 9C, the Fault Mode Routine 298 will now be explained. As discussed above, this routine is only entered after five attempts at transitioning all of cylinders 24, 26, 28, 30 to a low compression ratio have been unsuccessful. As illustrated, at step 314, a determination is made as to whether engine 12 is equipped with a variable cam timing mechanism, such as VCT mechanism 50. As discussed above, VCT mechanism 50 can control intake valve timing and exhaust valve timing in cylinders 24, 26, 28, 30 to control an effective torque produced by cylinders 24, 26, 28, 30. If the value of step 314 equals "No" indicating that VCT mechanism 50 is not present in engine 12, the method advances to step 316.

At step 316, a determination is made as to whether engine 12 is equipped with electronic throttle control (ETC). If the value of step 316 equals "Yes", the method enters throttle suppression fault mode represented by steps 318–326.

At step 318, controller 56 limits that maximum throttle position commanded by a vehicle operator to a predetermined throttle position TP_MAX. The position TP_MAX is determined during vehicle calibration and is a throttle position which prevents engine knock during high compression ratio operation.

Next at step 320, controller 56 controls throttle plate 22 and fuel injectors 58 to deliver a stoichiometric air-fuel mixture to cylinders 24, 26, 28, 30.

Next at step 322, a fluid pressure pulse P3 is transmitted to connecting rods 42, 44, 46, 48 via valve 148 to obtain a high compression ratio in cylinders 24, 26, 28, 30. Referring to FIGS. 2 and 10, controller 56 may generate signal ($V_{BL}$) to cause bleed valve 134 to provide a fluid pressure of 600 P.S.I. that is communicated to control valves 148, 150. Thereafter, controller 56 may generate signal ($V_{HCR}$) to cause valve 148 to open and supply fluid pressure pulse P3 to connecting rods 42, 44, 46, 48 to increase the compression ratio of the engine cylinders. The time duration $\Delta T3$ for applying fluid pressure pulse P3 may be calculated like $\Delta T1$ based on engine speed.

Next, at step 324, the ignition spark timing is retarded relative to MBT ignition timing to reduce the torque produced by cylinders 24, 26, 28, 30. In particular, controller 56 may retard the ignition timing in cylinders 24, 26, 28, 30 to obtain a 1–3% torque reduction relative to MBT in cylinders 24, 26, 28, 30.

Next at step 326, a Throttle_suppression_flag is set equal to one. Thereafter, the Fault Mode Routine 298 is exited.

Referring again to step 316, when the value of step 316 equals "No" indicating that engine 12 does not have electronic throttle control (ETC), the method enters a rich air-fuel mixture fault mode represented by steps 328–334.

At step 328, controller 56 controls throttle plate 22 and fuel injectors 58 to deliver an air-fuel mixture rich of stoichiometry to each of cylinders 24, 26, 28, 30.

Next at step 330, fluid pressure pulse P4 is transmitted to connecting rods 42, 44, 46, 48 via valve 148 to obtain a high compression ratio in cylinders 24, 26, 28, 30. Referring to FIGS. 2 and 10, controller 56 may generate signal ($V_{BL}$) to cause bleed valve 134 to provide a fluid pressure of 600 P.S.I. communicated to control valves 148, 150. Thereafter, controller 56 may generate signal ($V_{HCR}$) to cause valve 148 to open and supply fluid pressure pulse P4 to connecting rods 42, 44, 46, 48 to increase the compression ratio of the engine cylinders. The time duration for fluid pressure pulse P4 is also calculated like $\Delta T1$ based on engine speed.

Next at step 332, the ignition spark timing is retarded relative to MBT ignition timing to reduce the torque produced by cylinders 24, 26, 28, 30. In particular, controller 56 may retard the ignition timing in cylinders 24, 26, 28, 30 to obtain a 3–15% torque reduction relative to MBT in cylinders 24, 26, 28, 30.

Next at step 334, a Rich_mixture_flag is set equal to one. Thereafter, the Fault Mode Routine 298 is exited.

Referring again to step 314, if the value of step 314 equals "Yes" indicating engine 12 is equipped with variable cam timing device, such as VCT mechanism 50, the method enters a Miller combustion cycle fault mode by utilizing VCT mechanism 50 to control a closing timing of cylinder intake valves, as explained in detail below. The Miller combustion cycle is utilized to lower an effective pressure and torque produced by cylinders 24, 26, 28, 30 when operating all of engine cylinders in a high compression ratio because one or more of the cylinders were unable to transition to a low compression ratio in a prior iteration of method 278. During a Miller combustion cycle an intake valve communicating with an engine cylinder is either (i) closed before a piston reaches bottom-dead-center (BDC) position, referred to as early intake valve closing or (ii) closed after the piston reaches the BDC position, referred to as late intake valve closing. In either case, the amount of air mass inducted into the cylinder is less than a maximum air amount that could be obtained if the intake valve were kept open during an entire intake stroke.

At step 336, the controller 56 controls VCT mechanism 50 and corresponding intake valves to operate cylinders 24, 26, 28, 30 in a Miller combustion cycle. Referring to FIG. 13, the Miller combustion cycle is graphically illustrated with a graph of cylinder pressure versus specific volume. The graph illustrates a Miller combustion cycle with both (i) early intake valve closing and (ii) late intake valve closing.

The Miller combustion cycle with early intake valve closing will now be explained. During an intake stroke, between points 344, 346, intake valve is open and air is inducted into a cylinder. At point 346, the valve is prematurely closed before the piston reaches BDC at point 347. Thereafter, during a compression stroke, between points 347, 348, the air-fuel mixture is compressed by the piston. Next during a combustion stroke, between points 348, 350, the air-fuel mixture is combusted in the engine cylinder. Next during an expansion stroke, between points 350, 352, the piston moves from TDC toward BDC. Next during an exhaust stroke, between points 352, 344, an exhaust valve is open and expels the exhaust gases from the cylinder.

The Miller combustion cycle using late intake valve closing will now be explained. During an intake stroke, between points 344, 354, an intake valve is open and air is inducted into a cylinder. The intake valve is maintained in an open position until the piston returns from a point 354 at BDC to point 346. Thus, a portion of the air-fuel mixture is pushed out the engine cylinder between points 354, 346 which results in reducing an effective compression ratio of engine 12. The remaining compression stroke, combustion stroke, expansion stroke, and exhaust stroke are the same as discussed above.

Figure 9D:
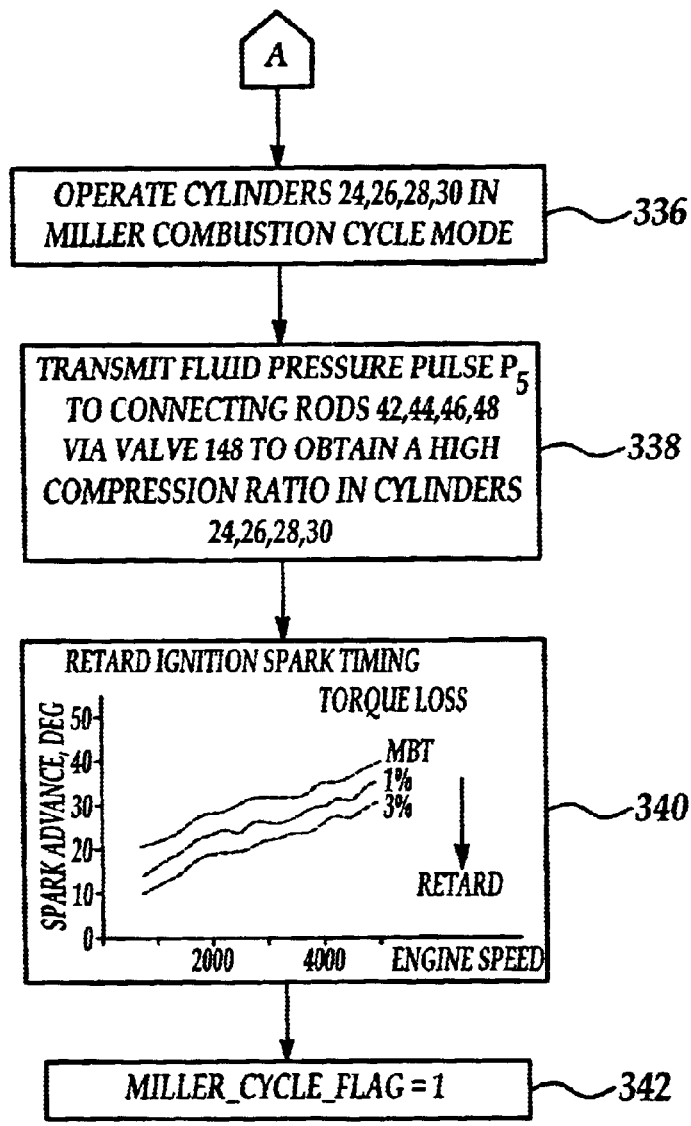

Referring again to FIG. 9D, after step 336, a step 338 transmits a fluid pressure pulse PS to connecting rods 42, 44, 46, 48 via valve 148 to obtain a high compression ratio in cylinders 24, 26, 28, 30. Referring to FIGS. 2 and 10, controller 56 may generate signal ($V_{BL}$) to cause bleed valve 134 to provide a fluid pressure of 600 P.S.I. communicated to control valves 148, 150. Thereafter, controller 56 may generate signal ($V_{HCR}$) to cause valve 148 to open and supply fluid pressure pulse P5 to connecting rods 42, 44, 46, 48 to increase the compression ratio of the engine cylinders. The time duration $\Delta T5$ for fluid pressure pulse PS may be calculated like $\Delta T1$ based on engine speed.

Next at step 340, the ignition spark timing is retarded relative to MBT ignition timing to reduce the torque produced by cylinders 24, 26, 28, 30. In particular, controller 56 may retard the ignition timing in cylinders 24, 26, 28, 30 to obtain a 1–3% torque reduction relative to MBT in cylinders 24, 26, 28, 30.

Next at step 342, the Miller_cycle_flag is set equal to one. Thereafter, the routine is exited.

Referring again to FIG. 9A, when the value of step 274 equals "No" indicating a high compression ratio is desired in cylinders 24, 26, 28, 30, the method advances to step 276. At step 276, the Switch to High Compression Ratio Routine is executed.

Figure 9E:
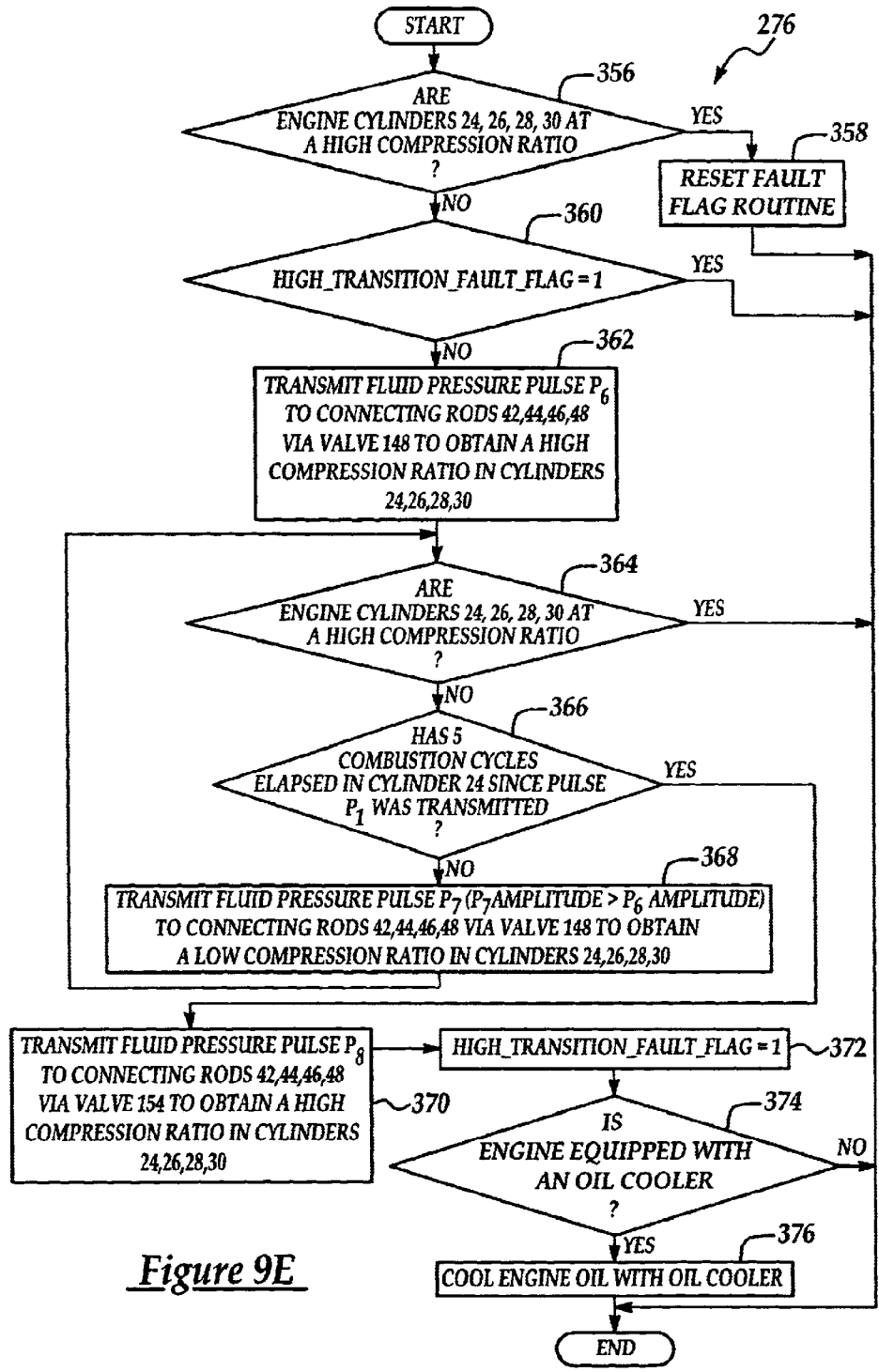

Referring to FIG. 9E, the Switch to High Compression Ratio Routine will now be explained. As illustrated, at step 356, a determination is made as to whether engine cylinders 24, 26, 28, 30, are currently operating at a high compression ratio. If the value of step 356 equals "No", the method advances to step 360.

At step 360, a determination is made as to whether a High_transition_fault_flag was set equal to one in a prior iteration of the routine 276. If the value of step 360 equals "Yes", then the method is exited. Otherwise, the method advances to step 362.

At step 362, fluid pressure pulse P6 is transmitted to connecting rods 42, 44, 46, 48 via valve 148 to obtain a high compression ratio in cylinders 24, 26, 28, 30. Referring to FIGS. 2 and 10, controller 56 may generate signal ($V_{BL}$) to cause bleed valve 134 to provide a fluid pressure of 600 P.S.I. communicated to control valves 148, 150. Thereafter, controller 56 may generate signal ($V_{HCR}$) to cause valve 148 to open and supply fluid pressure pulse P6 to connecting rods 42, 44, 46, 48 to increase the compression ratio of the engine cylinders. The time duration ΔT6 for fluid pressure pulse P6 may be calculated like ΔT1 based on engine speed. Referring again to FIG. 9E, after step 362, the method advances to step 364.

At step 364, a determination is made as to whether engine cylinders 24, 26, 28, 30, are operating at a high compression ratio. If the value of step 364 equals "Yes", then the step 362 was successful in transitioning the cylinders to a high compression ratio and the method is exited. Otherwise, the method advances to step 366. Alternately, step 364 could check for any deteriorated response in one or more of engine cylinders 24, 26, 28, 30 including for example: (i) determining when one or more of the cylinders have not transitioned to a high compression ratio within a predetermined time period or (ii) determining when the compression ratio in one or more of the cylinders has not been increased a predetermined amount.

At step 366, a determination is made as to whether a predetermined number of combustion cycles, such as five cycles, have occurred in cylinder 24 since the fluid pressure pulse P6 was applied to connecting rods 42, 44, 46, 48. If the value of step 366 equals "Yes", the method advances to step 370. Otherwise, the method advances to step 368.

At step 368, a fluid pressure pulse P7—that has a greater pressure than pulse P6—is transmitted to connecting rods 42, 44, 46, 48 via valve 148 to obtain a high compression ratio in cylinders 24, 26, 28, 30. For example, pressure pulse P7 may have a magnitude of 1000 P.S.I. as compared to a pressure of 600 P.S.I. for pulse P6. Referring to FIGS. 2 and 10, controller 56 may generate signal ($V_{BL}$) to cause bleed valve 134 to provide a pressure of 1000 P.S.I. to control valves 148, 150. Thereafter, controller 56 may generate signal ($V_{HCR}$) to cause valve 148 to open and supply fluid pressure pulse P7 to connecting rods 42, 44, 46, 48 to increase the compression ratio of the engine cylinders. The time duration ΔT7 for fluid pressure pulse P7 may be calculated like ΔT1 based on engine speed.

After step 368, the method returns to step 364. Thus, the method attempts to obtain a high compression ratio in all of cylinders 24, 26, 28, 30 for up to five combustion cycles, before defaulting to a low compression ratio in the engine cylinders.

Referring again to step 366, if the value of step 366 equals "No" indicating that at least one of cylinders 24, 26, 28, 30 did not transition to a high compression ratio, the method advances to step 370.

At step 370, fluid pressure pulse P8 is transmitted to connecting rods 42, 44, 46, 48 via valve 154 to obtain a low compression ratio in cylinders 24, 26, 28, 30. Referring to FIGS. 2 and 10, controller 56 may generate signal ($V_{BL}$) to cause bleed valve 134 to provide a fluid pressure of 600 P.S.I. communicated to control valves 148, 150. Thereafter, controller 56 may generate signal ($V_{LCR}$) to cause valve 150 to open and supply fluid pressure pulse P8 to connecting rods 42, 44, 46, 48 to increase the compression ratio of the engine cylinders. The time duration ΔT8 for fluid pressure pulse P8 may be calculated like ΔT1 based on engine speed.

Referring again to FIG. 9E, after step 370, a step 372 sets the High_transition_fault_flag equal to one indicating that at least one of cylinders 24, 26, 28, 30 were unable to transition to a high compression ratio in the present iteration of the method 276.

Next at step 374, a determination is made as to whether engine 12 is equipped with an oil cooler 128. If the value of step 374 equals "Yes", a step 376 cools engine oil transmitted to accumulator 130. Referring to FIG. 2, controller S6 can generate a signal ($V_{BYPASS}$) that causes bypass valve 132 to route oil from pump 124 through oil cooler 128. Thereafter, the cooled oil flows through check valve 136 to accumulator 130. Those skilled in the art will recognize that cooling the oil will increase the viscosity of the oil. The increased viscosity will tend to decrease an amount of any oil inadvertently leaking from fluid supply system 72. Thus, by decreasing possible oil leaks, the fluid pressure within fluid supply system 72 may be more accurately maintained to control connecting rods 42, 44, 46, 48. Referring to FIG. 9E, after step 376, the method is exited. Further, if the value of step 374 equals "No", indicating that engine 12 does not have an oil cooler, the method is also exited.

Referring again to step 356, if the value of step 356 equals "Yes" indicating that cylinders 24, 26, 28, 30 are operating at a desired high compression ratio, the step 358 executes the Reset Fault Flag Routine.

Figure 9F:
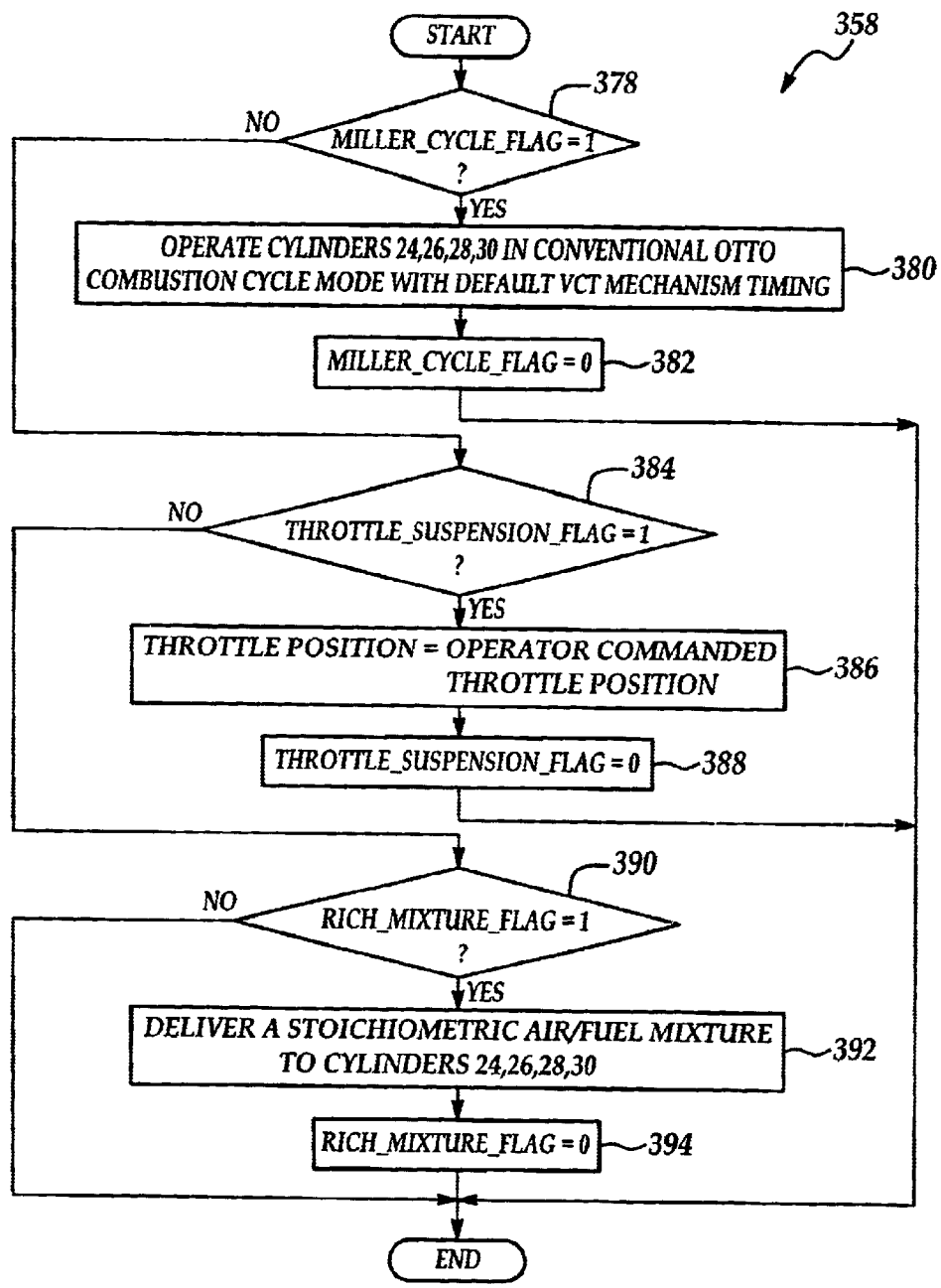

Referring to FIG. 9F, the Reset Fault Flag Routine will now be explained. As illustrated, at step 378, a determination is made as to whether the Miller_cycle_flag is set equal to one—indicating cylinders 24, 26, 28, 30 are being operated in a Miller combustion cycle. If the value of step 378 equals "Yes", a step 380 operates cylinders 24, 26, 28, 30 in a conventional Otto combustion cycle mode with default VCT mechanism timing. Referring to FIG. 14, a conventional Otto combustion cycle mode with default VCT timing is shown. In particular, during an intake stroke, between points 396, 398, an intake valve is opened to allow a maximum air charge to be inducted into a corresponding cylinder. Thus, instead of closing an intake valve before BDC or after BDC as done in a Miller combustion cycle, the intake valve is closed at BDC. Thereafter, the following combustion sequence is performed: (i) a compression stroke, between points 398, 400, (ii) a combustion stroke, between points 400, 402, (iii) an expansion stroke, between points 402, 404 and (iv) an exhaust stroke, between points 404, 396.

Referring again to FIG. 9F, after step 380, a step 382 resets the Miller_cycle_flag equal to zero and thereafter the method 358 is exited.

Referring again, to step 378, if the value of step 378 equals "No", indicating that the engine cylinders are not being operated in a Miller combustion cycle, the method advances to step 384.

At step 384, a determination is made as to whether Throttle_suppression_flag is set equal to one. If the value of step 384 equals "Yes", a step 386 sets the commanded position of throttle plate 22 equal to an operator commanded throttle position. In particular, controller 56 may receive accelerator pedal position signal (PP) and in response generate signal (DC) to cause motor 52 to move plate 22 to a predetermined position. Next at step 388, Throttle_suppression_flag is set equal to zero. Thereafter, the method 358 is exited.

Referring again to step 384, if the value of step 384 equals "No" indicating that engine 12 is not operating in throttle suppression fault mode, the method advances to step 390.

At step 390, a determination is made as to whether Rich_mixture_flag was set equal to one. If the value of step 390 equals "Yes", a step 392 delivers a stoichiometric air-fuel mixture to cylinders 24, 26, 28, 30. Thereafter, a step 394 sets Rich_mixture_flag equal to zero. Alternately, if the value of step 390 equals "No", the method 358 is exited.

The control system 14 and method for controlling an engine in accordance with the present invention provides a substantial advantage over known systems and methods. The system and method reduces undesirable engine torque fluctuations when one or more variable compression engine cylinders are unable to transition to a low compression ratio. In particular, when this malfunction occurs, the system and method transitions all of the engine cylinders to a high compression ratio to obtain an equivalent torque output in the engine cylinders to reduce engine torque fluctuations.

What is claimed:

1. A method for controlling an engine, said engine having first and second pressure responsive devices varying compression ratios in first and second engine cylinders, respectively, said method comprising:

commanding said first and second devices to decrease compression ratios in said first and second cylinders, respectively;

indicating when said first device has not decreased a compression ratio in said first cylinder; and, commanding said second device to increase a compression ratio in said second cylinder to reduce engine torque fluctuations.

2. The method of claim 1 wherein said step of commanding said first and second devices to decrease compression ratios in said first and second cylinders includes:

applying fluid pressure to said first and second devices to decrease compression ratios in said first and second cylinders, respectively, from a first compression ratio to a second compression ratio.

3. The method of claim 2 wherein said fluid pressure is applied to said first and second devices for a time interval extending through combustion cycles in both first and second cylinders.

4. The method of claim 2 wherein said step of commanding said second device to increase a compression ratio in said second cylinder includes:

applying fluid pressure to said second device to increase a compression ratio in said second cylinder from said second compression ratio to said first compression ratio.

5. The method of claim 1 wherein said step of commanding said second device to increase a compression ratio in said second cylinder includes:

increasing said compression ratio in said second cylinder to a value equal to said compression ratio in said first cylinder.

6. The method of claim 1 wherein said first device is an adjustable length connecting rod connected to a piston in said first cylinder, wherein said indicating step includes:

monitoring an effective length of said adjustable length connecting rod indicative of said compression ratio in said first cylinder; and, determining when said effective length of said connecting rod has not changed for a predetermined time period after commanding said connecting rod to decrease a compression ratio in said first cylinder.

7. The method of claim 1 further including:

indicating when said compression ratios of said first and second cylinders needs to be decreased based on engine operating conditions.

8. The method of claim 1 further including:

determining an engine speed and an engine load; and, determining whether compression ratios of said first and second cylinders should be decreased based on said engine speed and said engine load.

9. The method of claim 1 further including:

delaying a closing timing of a first intake valve communicating with said first cylinder during an intake stroke of said first cylinder to reduce an effective compression ratio in said first cylinder.

10. The method of claim 1 further including:

advancing a closing time of a first intake valve communicating with said first cylinder during an intake stroke of said first cylinder to reduce an effective compression ratio in said first cylinder.

11. The method of claim 1 further including:

operating said first cylinder in a Miller combustion cycle to reduce an effective compression ratio in said first cylinder.

12. The method of claim 1 further including:

limiting a maximum throttle position of a throttle valve communicating air to said first and second cylinders; and, delivering a stoichiometric air-fuel mixture to said first and second cylinders.

13. The method of claim 1 further including:

delivering an air-fuel mixture rich of stoichiometry to said first and second cylinders; and retarding an ignition timing in said first and second cylinders relative to a maximum brake torque ignition timing.

14. A method for controlling an engine, said engine having a plurality of pressure responsive devices varying compression ratios in a plurality of engine cylinders, respectively, said method comprising:

commanding said devices to decrease compression ratios in said engine cylinders;

indicating when at least one of said devices has not decreased a corresponding compression ratio; and, commanding all of said devices to increase compression ratios in said cylinders to reduce engine torque fluctuations.

15. A method for controlling an engine, said engine having first and second pressure responsive devices varying compression ratios in first and second engine cylinders, respectively, said method comprising:

commanding said first and second devices to decrease compression ratios in said first and second cylinders, respectively;

determining when said first device has not decreased a compression ratio in said first cylinder; and, increasing a compression ratio in said second cylinder to a value equal to a compression ratio in said first cylinder to reduce engine torque fluctuations.

16. A method for controlling an engine, said engine having first and second pressure responsive devices varying compression ratios in first and second engine cylinders, respectively, said method comprising:

supplying fluid pressure to said first and second devices to cause said devices to change compression ratios in said first and second cylinders, respectively, from a first compression ratio to a second compression ratio, said second compression ratio being less than said first compression ratio;

determining when said first device is unable to change a compression ratio in said first cylinder to said second compression ratio; and, supplying fluid pressure to said second device to obtain a compression ratio in said second cylinder equal to said first compression ratio to reduce engine torque fluctuations.

17. The method of claim 16 further including:

retarding ignition timing in said first and second cylinders away from maximum brake torque ignition timing to further reduce engine torque fluctuations.

18. A system for controlling an engine, said engine having first and second pressure responsive devices varying compression ratios in first and second engine cylinders, respectively, said system comprising:

a sensor that generates a signal indicative of a compression ratio of said first cylinder; and, a controller operably connected to said sensor, said controller configured to command said first and second devices to reduce compression ratios in said first and second cylinders, respectively, from a first compression ratio to a second compression ratio, said controller further configured to determine when said first device has not changed a compression ratio in said first cylinder based on said first signal, said controller further configured to command said second device to obtain said first compression ratio in said second cylinder to reduce engine torque fluctuations.

19. The system of claim 18 further including:

a fluid accumulator storing pressurized fluid that will be delivered to said first and second pressure responsive devices;

a pump supplying said pressurized fluid to said fluid accumulator; and, a first valve selectively communicating pressurized fluid from said fluid accumulator to said first pressure responsive device, said first valve opening responsive to a second signal from said controller.

20. The system of claim 18 wherein said pressurized fluid comprises engine oil.

21. An article of manufacture, comprising:

a computer storage medium having a computer program encoded therein for controlling an engine, said engine having pressure responsive devices varying compression ratios in engine cylinders, said computer storage medium comprising:

code for commanding said devices to decrease compression ratios in all of said cylinders;

code for determining when at least one of said devices has not decreased a corresponding compression ratio; and, code for commanding all of said devices to increase compression ratios in said cylinders to reduce engine torque fluctuations.

\* \* \* \* \*